United States Patent
Fang et al.

(10) Patent No.: US 7,391,237 B2
(45) Date of Patent: Jun. 24, 2008

(54) ROBUST AND ECONOMIC SOLUTION FOR FPGA BITFILE UPGRADE

(75) Inventors: Licai Fang, Beijing (CN); Lin Gan, Beijing (CN); Shunguang Ding, Beijing (CN); Jyshyang Chen, Cupertino, CA (US)

(73) Assignee: O2 Micro International Limited, Grand Cayman (KY)

( * ) Notice: Subject to any disclaimer, the term of this patent is extended or adjusted under 35 U.S.C. 154(b) by 235 days.

(21) Appl. No.: 11/207,355

(22) Filed: Aug. 18, 2005

(65) Prior Publication Data

US 2006/0244484 A1    Nov. 2, 2006

Related U.S. Application Data

(60) Provisional application No. 60/676,452, filed on Apr. 29, 2005.

(51) Int. Cl.
*G06F 11/20* (2006.01)
*G06F 11/14* (2006.01)

(52) U.S. Cl. ............... 326/46; 326/37; 711/162; 714/6; 714/54

(58) Field of Classification Search ............ 326/37, 326/38, 46, 47; 711/103, 155, 162; 714/6, 714/54
See application file for complete search history.

(56) References Cited

U.S. PATENT DOCUMENTS 6,845,276 B2 *  1/2005  Bocchi ............... 700/61
6,851,015 B2 *  2/2005  Akahane et al. ........ 711/103

* cited by examiner

*Primary Examiner*—Daniel D Chang

(57) ABSTRACT

A system for FPGA (Field Programmable Gate Array) upgrade includes: an FPGA, a FLASH memory and a CPLD. The FLASH memory includes a first section configured to store a workable version of bit files for the FPGA and a second section configured to store a backup version of bit files for the FPGA. The CPLD is coupled to the FPGA and the FLASH memory. The CPLD is configured to download the bit files from the FLASH memory to the FPGA to provide the FPGA with functionality. As a result, the CPLD communicates with CPU to upgrade the bit files in the FLASH memory, and indicates to the CPU which version of bit files has been downloaded to the FPGA.

21 Claims, 6 Drawing Sheets

ROBUST AND ECONOMIC SOLUTION FOR FPGA BITFILE UPGRADE

RELATED U.S. APPLICATION

This application claims priority to the co-pending provisional patent application, Ser. No. 60/676,452, entitled "A Robust and Economic Solution for FPGA Bitfile Upgrade," with filing date Apr. 29, 2005, and assigned to the assignee of the present invention, which is herein incorporated by reference in its entirety.

FIELD

The present disclosure relates to FPGA (Field Programmable Gate Array), and more particularly relates to upgrading the FPGA.

BACKGROUND

Firewall product Matrix9 has a network security board named NSB. The NSB is built with an FPGA (Field Programmable Gate Array) chip. When customers require new features or new bugs are found, system functions need to be upgraded.

FPGA is a kind of chip which will lose functions when it is powered off. So typically after powered on, FPGA must be programmed by an EEPROM (Electrically Erasable Programmable Read-Only Memory) to have its functions. EEPROM contains bit files which provide FPGA functionality. By upgrading the bit files, the FPGA can be upgraded.

Due to large FPGA, such as XILINX's Virtex II 6000, the bit files are too big to be fitted into a single chip EEPROM. As such, multiple EEPROMs are used to store such huge bit files. Thus, a lot of EEPROMs will occupy valuable PCB space which will reduce the reliability. One conventional approach incorporates a CPLD (Complex Programmable Logic Device) and a FLASH memory to implement the function of this special EEPROM. The FLASH memory stores the bit files. The CPLD communicates with CPU to upgrade bit files in FLASH memory and also downloads the bit files to the FPGA to provide the FPGA with the functionality. Through this method, typically, there always has a very high reliable channel for software to write bit files to the FLASH memory. An example is the CPU's GPIO (General Purpose Input Output).

However, some systems do not include a GPIO channel. For example some systems use a PCI (Peripheral Component Interconnection) interface to talk with the CPU, but this PCI interface is implemented by the FPGA. As a result, if upgrading bit files through the PCI interface failed, these systems will lose functions totally without capability of being repaired.

As a result, there is a need to develop a robust and economic solution for FPGA upgrade.

SUMMARY OF THE INVENTION

According to one embodiment of the present invention, there is provided a system for FPGA upgrade. The system includes an FPGA, a FLASH memory which stores workable version and backup version of FPGA bit files, and a CPLD which is configured to download bit files from FLASH memory to the FPGA, to communicate with CPU to upgrade the bit files in the FLASH memory, and to indicate the CPU which version of bit files is active in the FPGA.

According to another embodiment of the invention, there is provided an FPGA operation method. The method comprises storing two copies bit files which include a workable version and a backup version in FLASH memory, downloading the workable version of bit files to the FPGA, and upgrading the workable version stored in the FLASH memory. The method further comprises upgrading the backup version stored in the FLASH memory. The method further comprises comparing two version numbers read from PCI bus and FLASH memory to determine the upgrade is successful if the two numbers match.

DETAILED DESCRIPTION

Figure 1:
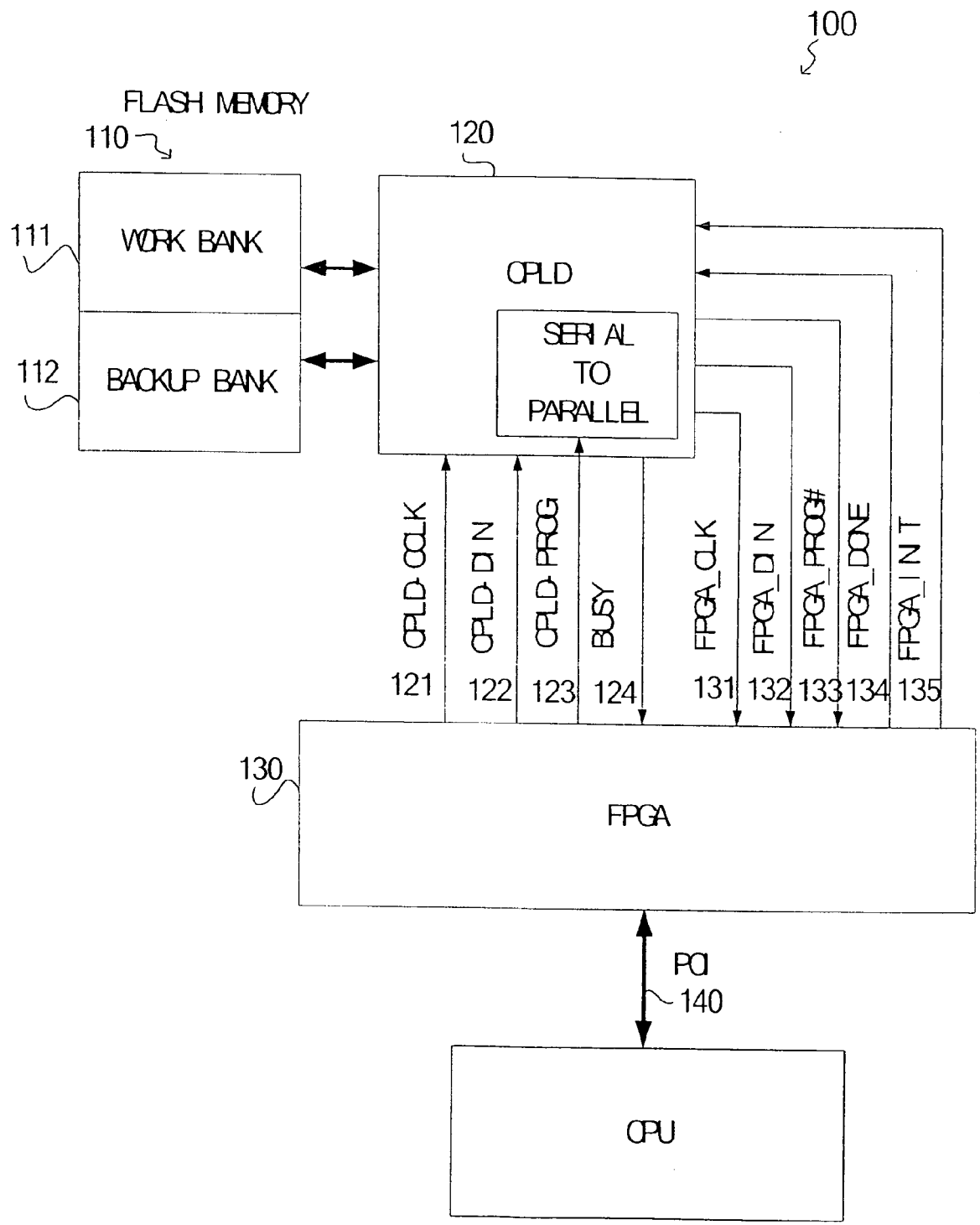
FIG. 1 is a block diagram of a system for FPGA upgrade, in accordance with one embodiment of the present invention.

Reference will now be made in detail to the preferred embodiments of the present invention, a system and method for FPGA upgrade, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention are implemented on software running on a computer system. For instance, the computer system is a personal computer, notebook computer, server computer, mainframe, or network device such as a switch, router, network control computer, networked computer, and the like. This software program is operable for installing licenses on an electronic device that is capable of supporting licensable features. In one embodiment, the computer system includes a processor couple to a bus and memory storage coupled to the bus. The memory storage can be volatile or non-volatile and can include removable storage media. The computer can also include a monitor, provision for data input and output, etc.

Some portions of the detailed description which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "downloading," "upgrading," "verifying," and "comparing," "determining," or the like, refer to the actions and processes of a computer system, or similar electronic computing device, including an embedded system, that manipulates and transforms data represented as physic (electronic) quantities within the computer system's registers and memories into other data similarly represented as physical quantities within the computer system memories or registers or other such information storage, transmission or display devices.

Accordingly, various embodiments of the present invention disclose a system and method for FPGA upgrade. Embodiments of the present invention provide for a robust channel for CPLD to talk with CPU to upgrade FPGA. Other embodiments provide reduced pin numbers by using only four pins for the communication channel, thus implementing an economic solution for FPGA upgrade.

FIG. 1 illustrates a system (100) for FPGA (Field Programmable Gate Array) upgrade. According to this embodiment, the system (100) includes an FPGA (130). The system also includes a FLASH memory (110) which is configured to store FPGA bit files. The bit files are the designed functions for the FPGA. The system (100) also includes a CPLD (Complex Programmable Logic Device) (120) which downloads bit files from the FLASH memory (110) to the FPGA (130) to make the FPGA have the designed functionality. The CPLD (120) also communicates with the CPU to upgrade the bit files and to indicate the CPU which version of the bit files is active in the FPGA.

To build a robust channel for the CPLD (120) to talk with the CPU, FLASH memory (110) is configured into two sections. One section is called a work bank (111) and the other section is called a backup bank (112). These two banks should store the same version of FPGA bit files. The version stored in work bank (111) is used as workable bit files and the version stored in backup bank (112) is used as backup bit files. Bit files provide the designed functionality for the FPGA. To upgrade FPGA (130) functionality, bit files are upgraded in FLASH memory (110).

According to one embodiment, either the work bank or the backup bank is chosen to be upgraded. For example, upgrading work bank (111) changes or improves FPGA functionality. On the other hand, upgrading backup bank (112) keeps the backup bit files updated. The backup bank is upgraded after the upgrade of the work bank is verified to be valid.

The present embodiment chooses to only upgrade the work bank (111) or only to upgrade the backup bank (112). At any time, only one of the banks is being upgraded, so even if this upgrade fails there still is another bank that is valid to make the FPGA (130) workable. This allows later field repair or upgrade. The two-bank mode ensures system (100) never loses functions totally, thus improving system reliability.

In this embodiment, CPLD (120) works as a center control component. Because the CPLD is coupled with the FPGA (130), the noise is controlled to an accessible level because all the connections are implemented on a single PCB which reduces wiring and gluing. Through using an in-bond mechanism on CPLD pins, embodiments of the present invention only use four pins to build the communication channel between the CPLD (120) and the FPGA (130).

In this embodiment, the CPLD (120) implements 3 input signals, which may include the following: CPLD_CCLK (121), which works as the clock signal for the CPLD to latch CPLD_DIN and CPLD_PROG; CPLD_DIN (122), which works to transmit bit files data and CPU commands; and CPLD_PROG (123), which is used as a command latch enable signal of a serial to parallel circuit. According to this embodiment, the CPLD implements one output signal: CPLD_BUSY (124). The output signal indicates either a busy status of FLASH memory when the CPU is upgrading FLASH, or indicates the CPU which bank is active in the FPGA (130) when the CPU does other operations or is idle.

According to one embodiment, by implementing an in-band encoding mechanism, CPLD_DIN (122) can support multi commands from the CPU, thus reducing CPLD pins. In this embodiment, the following encodes make CPLD_DIN (122) support multi commands from the CPU: "4'b1010" makes CPLD_DIN support "boot from work bank (214)" command from the CPU; "4'b1011" makes CPLD_DIN support "boot from backup bank (216)" command from the CPU; "4'b0110" makes CPLD_DIN support "upgrade work bank (218)" command from the CPU; "4'b0111" makes CPLD_DIN support "upgrade backup bank (222)" command from the CPU.

In the present embodiment, the CPLD implements one output signal: CPLD_BUSY (124). The CPLD_BUSY (124) signal implements two functions. The first function for the CPLD_BUSY is to indicate to the CPU a busy status of the FLASH memory (110) when bit files are being upgraded in FLASH memory (110). In other words, this signal works as the flow control between the CPU and the FLASH memory. The second function for the CPLD_BUSY (124) is to indicate to the CPU which bank's bit files are active in the FPGA after the CPLD finishes downloading bit files to the FPGA (130). When writing bit files into the FLASH memory, the CPU defines the CPLD_BUSY (124) as a busy status of the FLASH memory. When the CPU does other operations or is idle, the CPLD_BUSY (124) represents the work bank, thus showing the CPU which bank's bit files are active in the FPGA.

Upon power on, or after the recycle of the power source, FPGA (130) logic will be automatically cleared during the initialization phase. In this embodiment, FPGA implements three input signals which includes the following: FPGA_CLK (131), which is the configuration clock input signal used by the internal configuration logic; FPGA_DIN (132); and FPGA_PROG (133), which resets the internal configuration logic and reinitializes the internal configuration memory.

In this embodiment, FPGA implements two output signals which includes the following: FPGA_DONE (134) and FPGA_INIT (135). The FPGA_DONE (134) signal indicates the completion of configuration and is set low on erasure process. The FPGA_INIT (135) signal indicates erasure processing in progress or program error. The FPGA_INIT signal is maintained low after erasure to indicate the FPGA to wait for programming. The CPU can write value to drive the output signals, and also can read the value back from the input signal. The CPU can access these signals via special register access. System software will issue commands to communicate with the CPLD via the special register access mentioned above.

Figure 2:
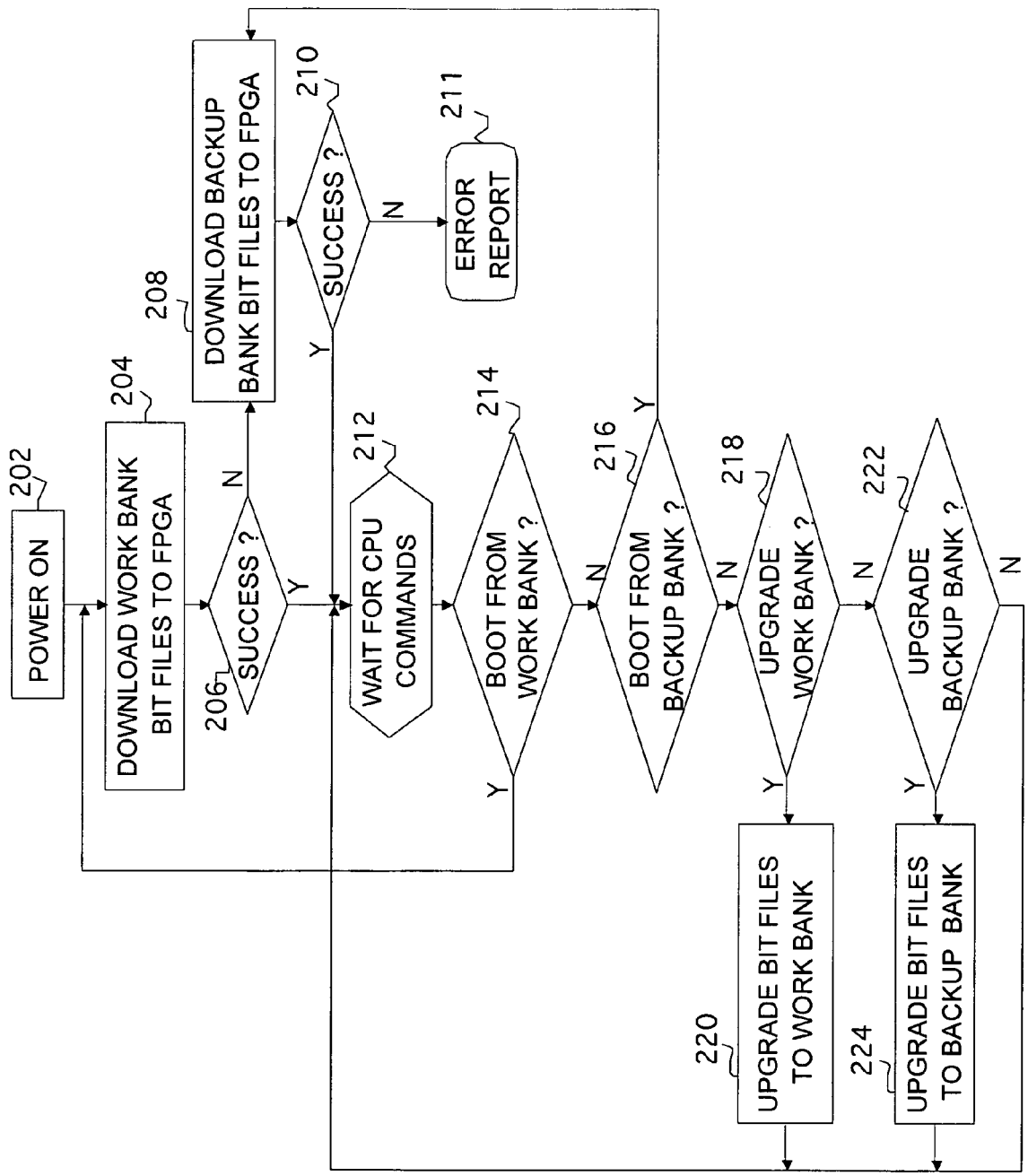
FIG. 2 is a flow chart of CPLD implementation, in accordance with one embodiment of the present invention.

FIG. 2 illustrates a flow chart of an embodiment of CPLD implementation. If the FPGA device is to be configured upon power-up, or after the recycling of the power source, the configuration logic will be automatically cleared during this initialization time. So after powered on (202), CPLD (120) will download work bank bit files to the FPGA (204). Then the CPLD will check whether this operation is successful or not (206). If this download succeeds, the CPLD (120) will wait for CPU commands (212). If this download fails, the CPLD will switch to download backup bank bit files to FPGA (208). If download from backup bank succeeds, the CPLD (120) will go to wait for CPU commands (212). If download from backup bank fails, there must be some error and the CPLD will send error report (211) to the CPU.

According to this embodiment, at (214) a decision is made whether to boot from the work bank, if user enters "yes", the CPLD will download work bank bit files to the FPGA (204). On the other hand, at (216) a decision is made whether to boot from backup bank. If a user chooses to boot from the backup bank, the CPLD will download backup bank bit files to the FPGA (208). At (218), the CPU will request whether to upgrade work bank or not. If a user chooses to upgrade the work bank, CPLD (120) will erase work bank bit files and write new bit files into work bank.

If the user chooses not to upgrade the work bank, the CPU will request whether to upgrade backup bank (222). If the user chooses to upgrade the backup bank, the CPLD (120) will erase backup bank bit files and write into new bit files. If the user chooses not to upgrade the backup bank, the CPLD will go back to wait for CPU commands (212).

As a result, if user chose to boot from work bank (214) again after the work bank upgrade is finished, work bank bit files will be reloaded to the FPGA. If the FPGA functionality changed, the upgrade is proved to be successful.

Figure 3:
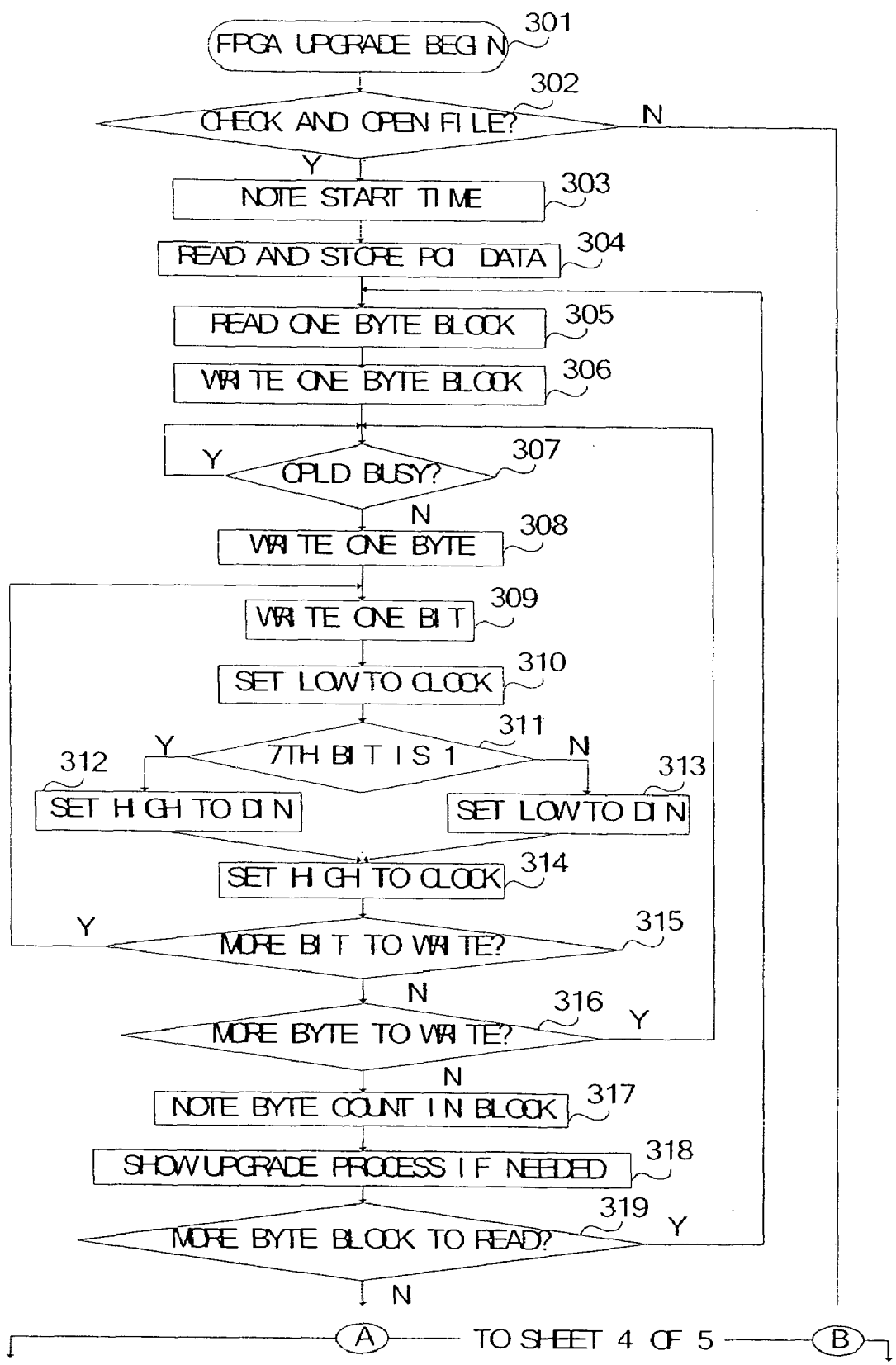
FIG. 3 and FIG. 4 illustrate a flow chart of CPU implementation, in accordance with one embodiment of the present invention.
Figure 3:
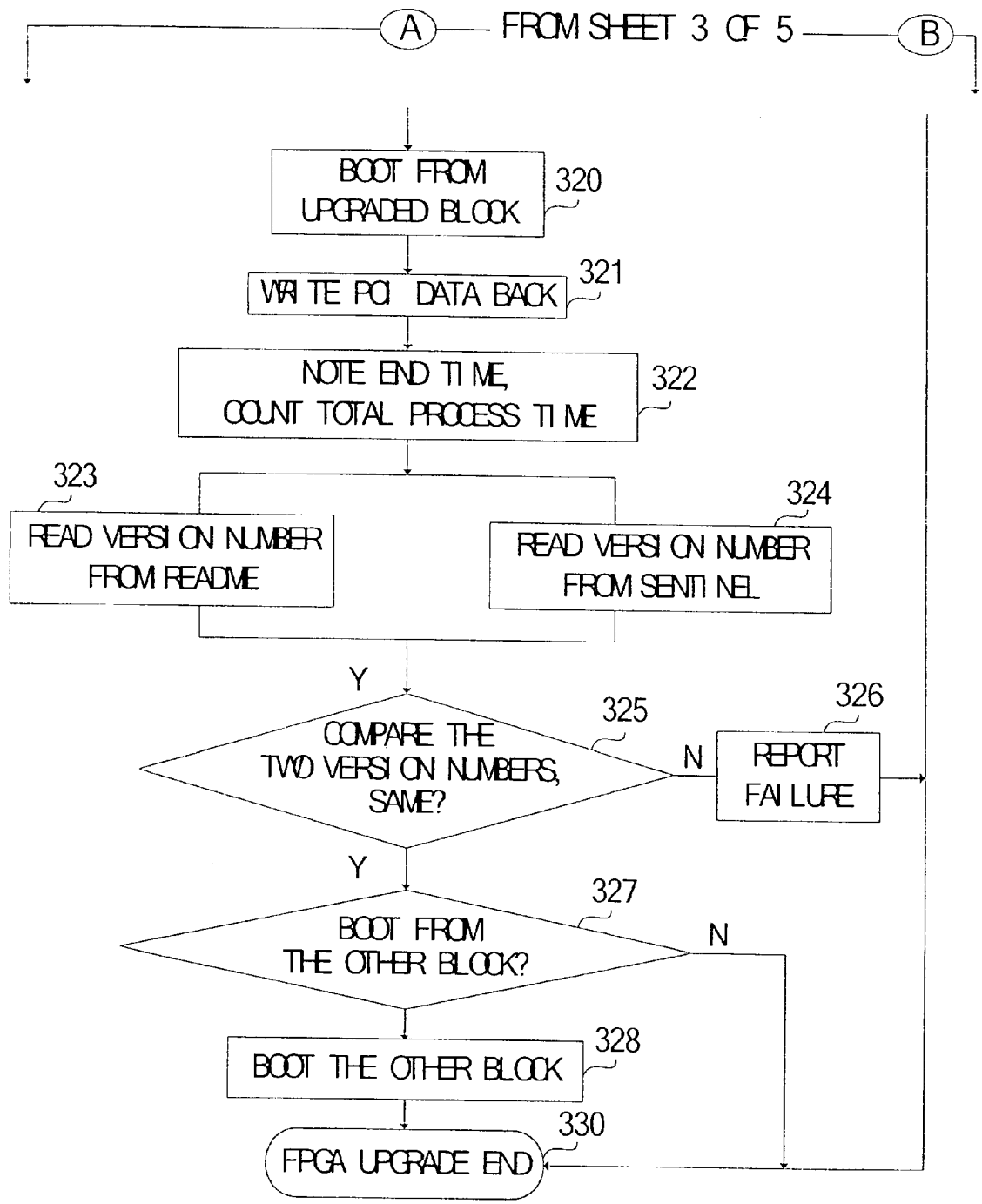

FIG. 3 illustrates a flow chart of an embodiment of FPGA upgrade implementation from CPU side. The CPU communicates with CPLD (120) to let user upgrade bit files. The CPU also communicates with the CPLD to let user chose which bank to upgrade. And further the CPU communicates with the CPLD to verify the upgrade.

In this embodiment, after FPGA upgrade begins (301), the CPU requests whether to check and open file (302). If a user enters "no", the CPU will go to FPGA upgrade end (330). If the user enters "yes", the CPU will note start time (303), then the CPU will read PCI data and write it into FLASH memory (304).

At (305), the CPU reads one byte block. The CPU writes the one byte block into the FLASH memory (306). After that, the CPU checks CPLD_BUSY (307) which indicates a busy status of FLASH memory to confirm whether the FLASH memory (110) is busy. The CPU will continue checking CPLD_BUSY (307) until the FLASH memory is ready to receive new data. At (308), the CPU writes one byte into the FLASH memory when the CPLD is not busy. At (309), the CPU writes one bit into the FLASH memory. Then the CPU sets low the clock (310). The clock is the sampling clock of CPLD_DIN (122) and CPLD_PROG (123). If the 7th bit is "1" (311), the CPU will set high the CPLD_DIN (312) which indicates CPLD prepares to transfer data. If the 7th bit is not "1", the CPU will set low the CPLD_DIN (313). Then the CPU sets high the clock (314). After that, the CPU will check whether there are more bits to write (315). If the user enters "yes", the CPU will go back to write one bit (309). If the user enters "no", the CPU will check whether there are more bytes to write (316). If the user wants to write more bytes, the CPU will go back to check the CPLD_BUSY (307).

Figure 4:
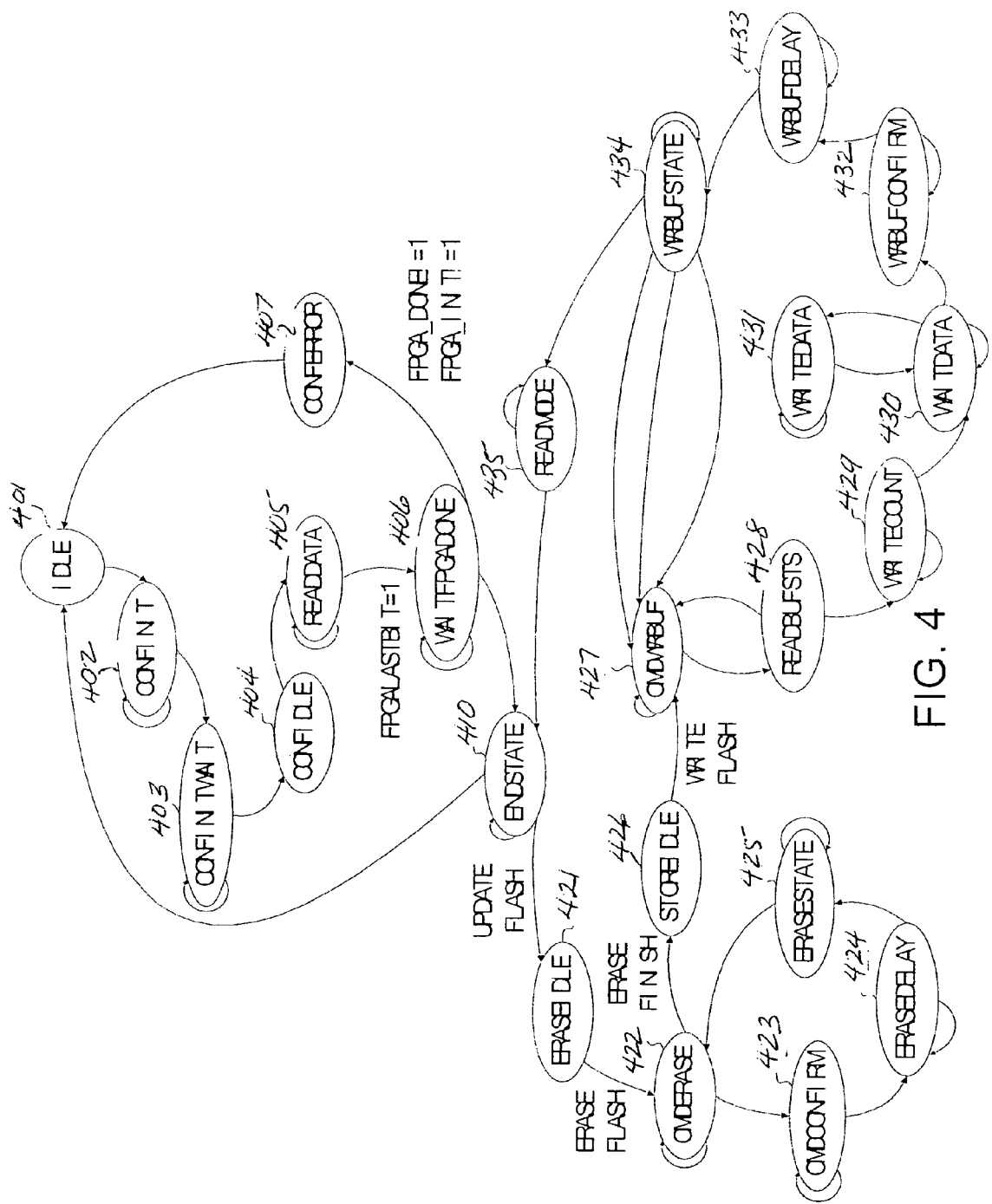

If there are no more bytes to be written into FLASH, the CPU notes byte count in block (317) of the FLASH memory which is used to show upgrade progress if needed (318). Then the CPU will check whether there's a byte block to read (319). If a user enters "yes", the CPU will go back to read one byte block (305). If the user enters "no", the CPU will boot from the updated block (320) in FIG. 4 to make the block active. At (321), the CPU writes PCI data back. Then the CPU notes end time and counts total process time (322).

Advantageously, according to one embodiment, CPU reads version number in readme file (322) from PCI bus (140) and reads another version number in sentinel from FLASH memory (324). Then the CPU compares the two version numbers (325). The upgrade is proved to be successful if the two version numbers match, this means the new bit files have been successfully written into the FLASH memory (110). On the other hand, if the two version numbers do not match, this means the upgrade has failed. In this case, the CPU will report a failure and go back to whether to check and open file (302).

When the CPU is writing block in FLASH memory, for example the CPU is writing block 0, this implementation takes place in another block, for example block 1. Block 0 will be active automatically after data has been written into it. As such, the CPU needs to check whether to boot from the other block (327). The CPU boots from the other bank (328). FPGA upgrade ends.

Figure 5:
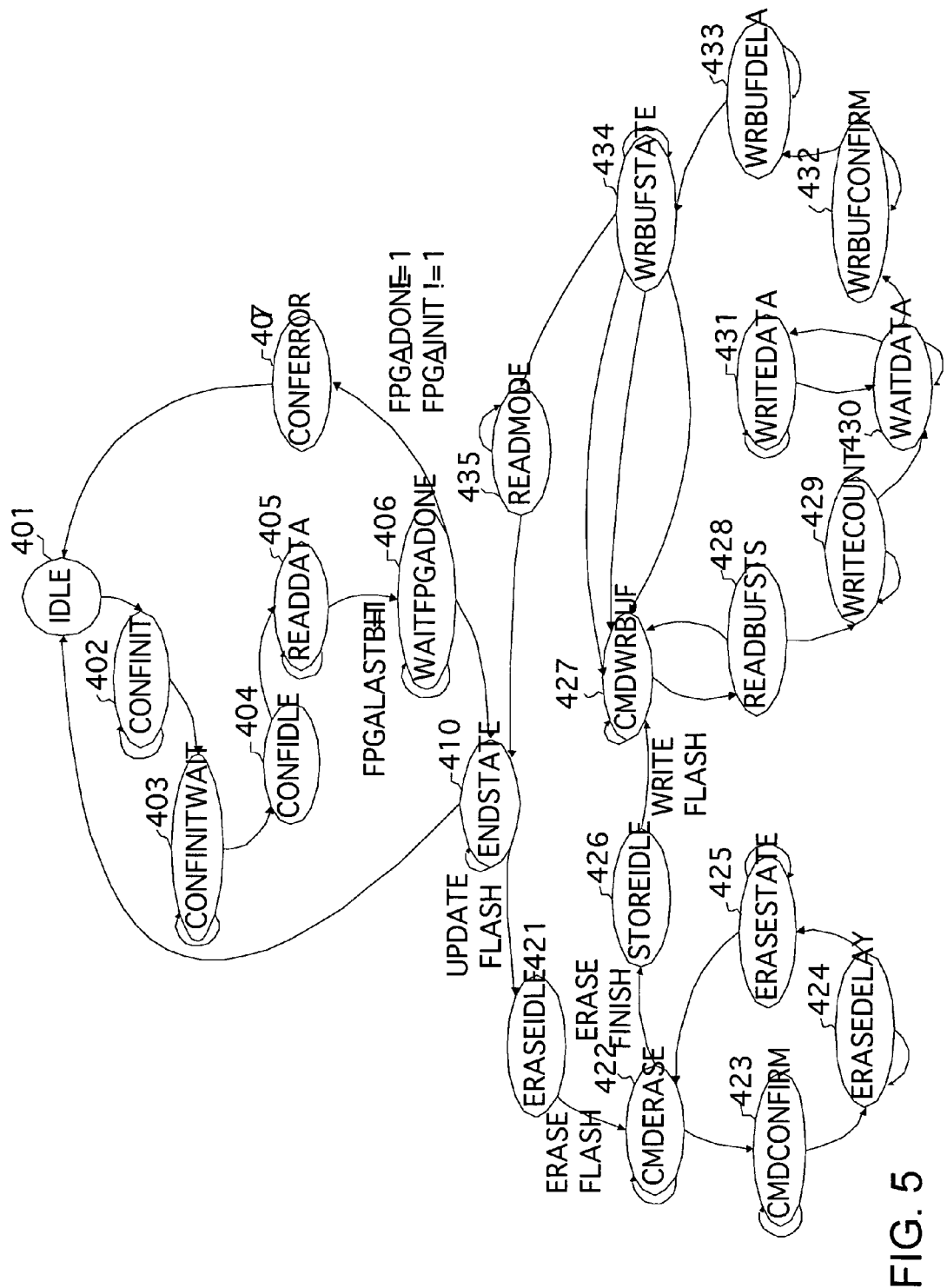
FIG. 5 is a diagram of CPLD state machine, in accordance with one embodiment of the present invention.

FIG. 5 illustrates a diagram of an embodiment of CPLD state machine implementation. Upon power on, state machine begins with idle state (401). The state machine goes to configuration initiation state (402) automatically to start FPGA initiation. During the initiation phase, FPGA logic will be automatically cleared. When time counter=25, state machine goes to wait for configuration (403). When $FPGA_{13}INIT$ register=1, the state machine goes to configuration idle (404), this means the FPGA prepares to receive data. At (405) the state machine goes to read data automatically, this means the CPLD prepares to configure the FPGA. When time counter=7 and FPGA last bit=1, this means FPGA configuration has been done, and the state machine goes to wait for FPGA_DONE (406). When time counter=25 and FPGA_DONE register=1, this means the FPGA has been configured successfully, and the state machine goes to end state (410)

When time counter=25, if configuration count out=0, this means current configuration data is from work bank of the FLASH memory (110) and FPGA_DONE register!=1, this means the data from work bank has not been configured successfully into the FPGA. As a result, the state machine reports a configuration error (407). When time counter=25, FPGA_DONE register!=1 and configuration count out=1, this means the current configuration data from backup bank has not been successfully written into FPGA. As a result, configuration from work bank (110) and backup bank (112) both fail, and the state machine goes to end state (410) wherein a serious error is reported to FAE.

The state machine switches from configuration error (407) to idle (401) automatically, this means the CPLD prepares download data from backup bank to configure the FPGA (130). According to this embodiment, when ersenreg=4'b0110 and CPLD_PROG_N=1, the state machine will switch from end state (410) to idle (401) and the CPLD starts to use work bank to configure the FPGA again. When ersenreg=4'b0111 and CPLD_PROG_N=1, the state machine will switch from end state (410) to idle (401) and the CPLD starts to use back up bank to configure the FPGA again.

In this embodiment, when ersenreg=4'b1010 and CPLD_PROG_N=1, this means the CPLD prepares to upgrade work bank (111). Otherwise when ersenreg=4'b0011 and CPLD_PROG_N=1, this means the CPLD prepares to upgrade backup bank (112), the state machine switches from end state (410) to erase idle (421). The state machine implements erase command automatically (422), this means the CPLD prepares erasing data in the FLASH memory (110). The state machine implements confirm command (423), wherein when last block erased=0, this means the bank has not been erased completely. When time counter=5, the state machine goes to erase delay (424). As such, the CPLD starts erasing one block in the bank. When time counter=25, the state machine goes to erase state (425) automatically. As a result, the state machine will implement erase command (422), wherein when fsts=1, this means one block has been erased totally. When the last block erased=1, this means the bank has been erased completely. As such, the state machine will go to store idle state (426), this means the CPLD upgrades the FPGA configuration data.

According to this embodiment, the state machine implements write buffer command (427) automatically. In one embodiment, when time counter=5, the state machine will go to read buffer state (428), this means data is being written into FLASH (110) buffer. When time counter=8 and buffer ready=0, this means FLASH buffer has not been written fully. As such, the state machine goes to implement write buffer command (427). On the other hand, when buffer ready=1, this means FLASH buffer has been written fully. As a result, the state machine goes to write count (429). When time counter=5, the state machine switches from write count (429) to wait data state (430) automatically.

According to this embodiment, when reachbufup=0, this means parallel data in the FLASH buffer has not been completely transferred into serious data, and when shiftinrdy=1, this means the CPLD starts serious to parallel transition, the state machine will go to write data state (431). When time counter=5, the state machine goes from write data state (431) to wait data state (430). When reachbufup=1, this means parallel data in FLASH buffer has been completely transferred into serious data, the state machine will switch to write buffer confirm (432).

When time counter=5, the state machine will switch to write buffer delay state (433), this means data has been written into one block of the FLASH memory (110). Then when time counter=25, the state machine goes to write buffer state (434) automatically. When fsts=1, this means one block in FLASH memory (110) has been upgraded successfully. On the other hand, when FPGA last buffer!=1, this means FPGA bit files haven't been upgraded successfully. As such, the state machine will implement write buffer command (427). Otherwise, when FPGA last buffer=1, this means one block of the FLASH memory (110) has been upgraded successfully and the FPGA configuration data has been upgraded successfully. As a result, the state machine will switch from write buffer state (434) to read mode (435), this means the FPGA has been set into configuration state. When time counter=5 again, the state machine will go from read mode (435) to end state (410). This indicates FPGA upgrade end.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

The invention claimed is:

1. A system for FPGA (Field Programmable Gate Array) upgrade, comprising:
    an FPGA;
    a FLASH memory, wherein said FLASH memory comprises a first section configured to store a workable version of bit files for said FPGA, and a second section configured to store a backup version of said bit files for said FPGA, wherein said bit files provide functionality to said FPGA; and
    a CPLD (Complex Programmable Logic Device) coupling said FPGA and said FLASH memory which is configured to download said bit files from either one of said first and second section of said FLASH memory to said FPGA to provide said FPGA with said functionality, said CPLD being capable of providing four signals to communicate with said FPGA.

2. The system of claim 1, wherein said CPLD is further configured to communicate with a CPU to upgrade said workable version of said bit files stored in said FLASH memory.

3. The system of claim 2, wherein said CPLD is further configured to communicate with said CPU to upgrade said backup version of said bit files stored in said FLASH memory after verifying said workable version is valid.

4. The system of claim 1, wherein said CPLD is further configured to communicate with a CPU to upgrade said backup version of said bit files in said FLASH memory.

5. The system of claim 1, wherein one of said four signals is configured to transmit said bit files to said FPGA and to transmit CPU commands between said CPLD and a CPU.

6. The system of claim 1, wherein one of said four signals works as an enable signal of a serial to parallel circuit, wherein said serial to parallel circuit is used to transform said CPU commands from serial into parallel format.

7. The system of claim 1, wherein one of said four signals of said CPLD signal indicates said FLASH memory is busy when said FLASH memory is dedicated to upgrading said bit files stored in said FLASH memory, such that said signal works as a flow control between said CPU and said FLASH memory.

8. The system of claim 7, wherein said one of said four signals is further configured to indicate which version of said bit files stored in said FLASH memory has been downloaded to said FPGA.

9. The system of claim 1, wherein one of said four signals works as a clock signal to latch transmission of said bit files and said CPU commands, and to latch said enable signal.

10. A method of FPGA operation comprising:
    storing a workable version of bit files in a first section of FLASH memory;
    storing a backup version of said bit files in a second section of said FLASH memory; and
    downloading said workable version of said bit files to an FPGA to provide functionality to said FPGA through a CPLD (Complex Programmable Logic Device), wherein said CPLD providing four signals in communication with said FPGA.

11. The method of claim 10, further comprising:
    downloading said backup version of said bit files to said FPGA when said downloading said workable version fails.

12. The method of claim 10, further comprising:
    upgrading said workable version of said bit files stored in said FLASH memory by writing new bit files read from a PCI bus into said workable version of said FLASH memory.

13. The method of claim 10, further comprising:
    verifying said workable version of said bit files is valid; and
    upgrading said backup version of said bit files in said FLASH memory by writing new bit files read from a PCI bus as said backup version into said FLASH memory.

14. The method of claim 10, further comprising:
    upgrading said backup version of said bit files in said FLASH memory, by writing new bit files read from a PCI bus into said backup version of said FLASH memory to make said backup version updated.

15. The method of claim 12, further comprising:

comparing a first version number of said new bit files read from said PCI bus against a second version number associated with said bit files of said workable version stored in said FLASH memory that is upgraded; and determining that said upgrading said workable version is successful when said second version number matches said first version number.

16. The method of claim 13, further comprising:

comparing a first version number of said new bit files read from said PCI bus against a second version number associated with said bit files of said backup version stored in said FLASH memory that is upgraded; and determining that said upgrading said backup version is successful when said second version number matches said first version number.

17. A method for FPGA upgrade comprising:

storing two copies of Field Programmable Gate Array (FPGA) bit files in FLASH memory, wherein a first copy comprises a workable version of said FPGA bit files and a second copy comprises a backup version of said FPGA bit files, to ensure there is always one valid copy of bit files to enable said FPGA; and using a CPLD (Complex Programmable Logic Device) coupling said FPGA and said FLASH memory to upgrade said backup version of said bit files in said FLASH memory by writing new bit files which are read from a PCI bus as said workable version into said FLASH memory, wherein said CPLD providing four signals in communication with said FPGA.

18. The method of claim 17, further comprising:

verifying said workable version is valid;

upgrading said backup version of said bit files in said FLASH memory by writing new bit files read from said PCI bus as said backup version into said FLASH memory.

19. The method of claim 17, further comprising:

upgrading said backup version of said bit files in said FLASH memory by writing new bit files read from said PCI bus into said backup version of said FLASH memory.

20. The method of claim 17, further comprising:

comparing a first version number of said new bit files read from said PCI bus against a second version number associated with said bit files of said workable version stored in said FLASH memory that is upgraded; and determining that said upgrading said workable version is successful when said second version number matches said first version number.

21. The method of claim 18, further comprising:

comparing a first version number of said new bit files read from said PCI bus against a second version number associated with said bit files of said backup version stored in said FLASH memory that is upgraded; and determining that said upgrading said backup version is successful when said second version number matches said first version number.

* * * * *